UNITED STATES PATENT OFFICE.

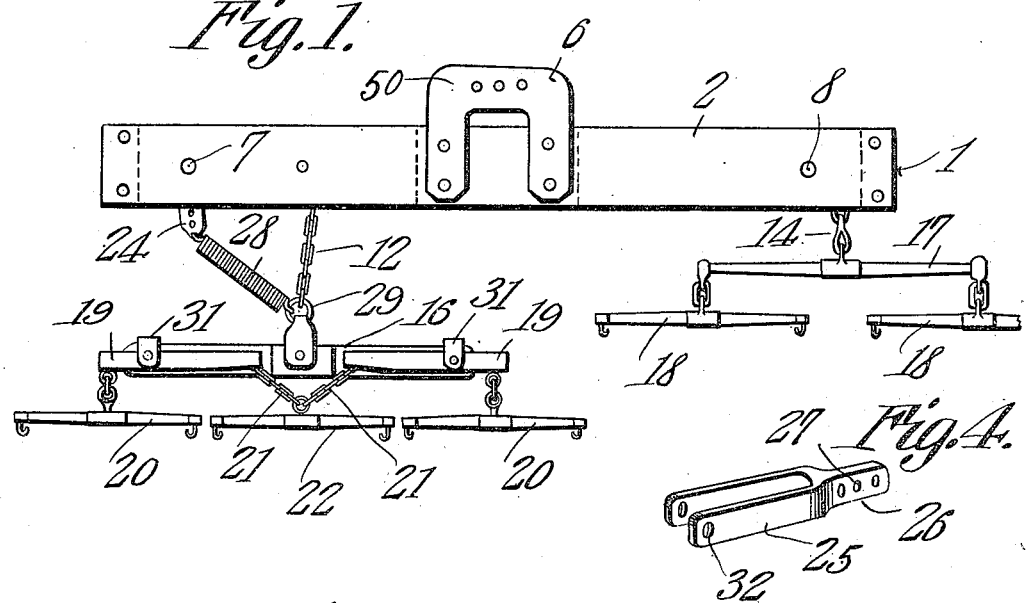
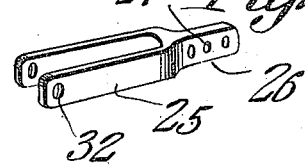
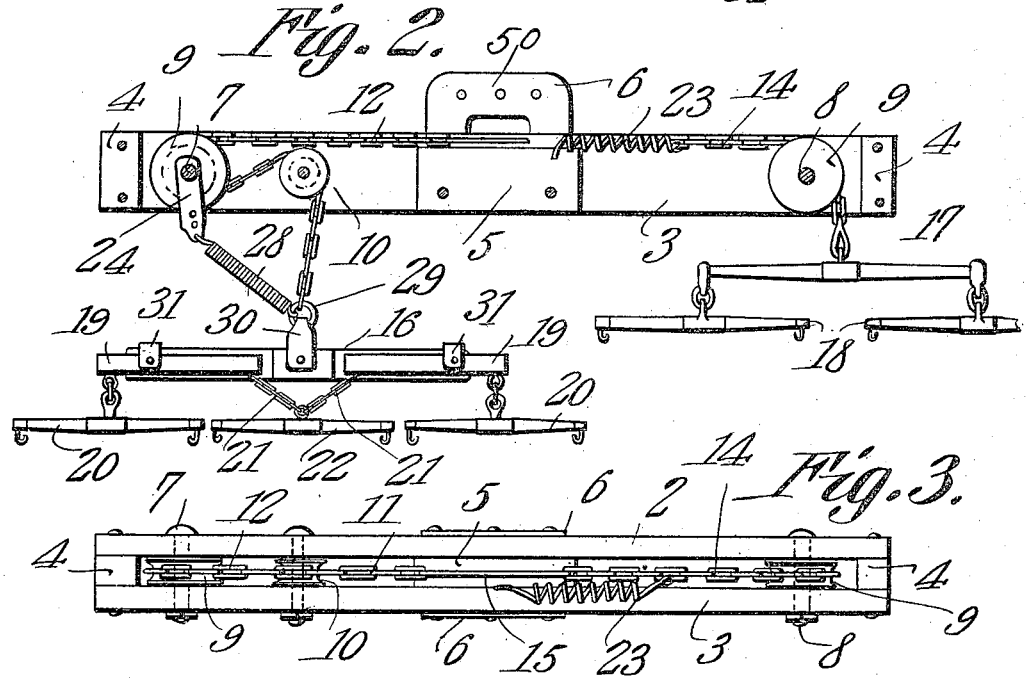
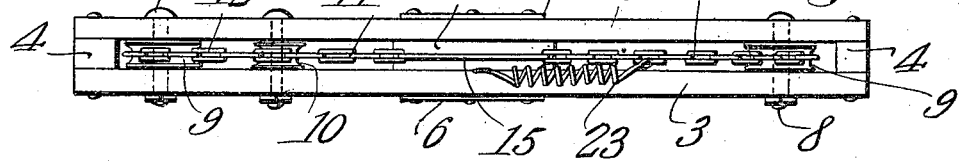

HENRY A. SCHAUB, OF KEARNEY, NEBRASKA.

DRAFT-EQUALIZER.

961,649.  Specification of Letters Patent.  Patented June 14, 1910.

Application filed September 1, 1909.  Serial No. 515,594.

*To all whom it may concern:*

Be it known that I, HENRY A. SCHAUB, a citizen of the United States, residing at Kearney, in the county of Buffalo and State of Nebraska, have invented a new and useful Draft-Equalizer, of which the following is a specification.

The objects of the invention are, generally, provision in a merchantable form of a device of the above-mentioned class, which shall be inexpensive to manufacture, facile in operation, and devoid of complicated parts; specifically, the provision of a five horse draft equalizer in which the tractile efforts of three of the draft animals may be offset against the tractile efforts of two of the draft animals to secure an equitable distribution of the load, the invention, consisting, among other things, in interposing into the structure of the equalizer, resilient members whereby the above-mentioned results may be secured; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood, that, within the scope of what hereinafter thus is claimed, divers changes in the form, proportions, size, and minor details of the structure may be made, without departing from the spirit or sacrificing any of the advantages of the invention.

Similar numerals of reference are employed to denote corresponding parts throughout the several figures of the drawings.

In the accompanying drawings, Figure 1 shows my invention in top plan; Fig. 2 is a top plan in which a portion of the equalizer bar has been removed, better to illustrate the internal mechanism of the device; Fig. 3 is a rear elevation; and Fig. 4 is a detailed perspective of the arm whereby one of the resilient elements is adjustably connected with the equalizer bar.

The invention includes, primarily, an equalizer bar which in the appended drawings is denoted generally by the numeral 1. This equalizer bar 1 is composed of an upper plate 2 and a lower plate 3 spaced apart at their ends by blocks 4, and, intermediate their ends, by a centrally disposed block 5. Centrally mounted upon the plates 2 and 3 are clevis members 6 united with the plates 2 and 3 and with the middle block 5 by means of bolts or other elements adapted to a like end. The clevis members 6 are provided with a plurality of openings 50, clearly shown in Figs. 1 and 2, adapted successively to receive a pin whereby the device may be connected pivotally with the load, the successive mounting of the pin in the openings, serving to vary the lengths of the segments of the equalizer bar, to suit the exigencies of the proposed use.

Securely mounted in the plates 2 and 3, adjacent their ends are pivot members 7 and 8, upon which, between the plates 2 and 3, are journaled for rotation end pulleys 9. Journaled for rotation between the plates 2 and 3, and located relatively near to one of the end pulleys 9 is an intermediate pulley 10 which is of smaller diameter than the end pulleys 9.

The invention further includes a flexible element 11. This flexible element 11 includes two component flexible members, preferably chains, denoted by the numerals 12 and 14, united at their adjacent ends by a rod 15. The free end of the member 14 is passed around one of the end pulleys 9 and extends to the front of the bar 1, the remainder of the member 14, the rod 15, and the adjacent end of the member 12 extending along the rear of the bar 1. The free end of the member 12 is passed forwardly around the other of the end pulleys 9, thence rearwardly around the intermediate pulley 10 and arranged to extend to the front of the bar 1, it being noted, that, owing to the fact that the intermediate pulley 10 is made of less diameter than the end pulleys 9, the portion of the member 12 which is mounted in the groove of the pulley 10 is spaced apart from that portion of the member 12 which lies between the adjacent end pulley 9 and the rod 15.

The free end of the member 14 which extends to the front of the bar 1 is assembled in any suitable manner with a double tree 17 to the ends of which are pivotally connected swingle trees 18. The portion of the member 12 which extends to the front of the bar 1 terminates in a ring 29 inclosed within a clevis 30 mounted upon a triple tree 16 intermediate its ends. Clevis members 31 are mounted adjacent the extremities of the triple tree 16, these clevis members serving as fulcrums for levers 19, having their shorter arms slightly extended beyond the ends of the triple tree 16, their longer arms being disposed between the clevis members 31. The remote extremities of the levers 19 carry swingle trees 20, united therewith in any desired manner. A swingle tree 22 is provided, adapted to be located between the swingle trees 20, this swingle tree 22 being united with the adjacent ends of the levers 19 by connections 21, diverging from the central portion of the swingle tree 22 to the adjacent ends of the levers 19. These connections may be of any form; in the present instance, they are shown as chains, but any other form of connection adapted to be put under tension to a like end may be substituted therefor.

A retractile element, preferably a helical spring 23 is provided, one end of which is securely connected with the bar 1, preferably being introduced between one of the plates 2 and 3 and the middle spacing block 5; the other end of the spring 23 terminating in a hook which is adapted to be mounted in successive links of the chain 14, between the rod 15 and the end pulley 9 over which the member 14 passes.

An arm 24 is provided, and, by referring to Fig. 4, it will be seen that this arm is split at one end to form spaced bifurcations 25 from which extends a shank 26, provided with a series of openings 27. The portions 25 are apertured as denoted by the numeral 32 to receive the pivot member 7, whereby the arm 24 may be pivotally mounted, the end pulley which is carried by the pivot member 7 being disposed between the bifurcations 25 of the arm, it being understood that these bifurcations are sufficiently spaced apart so that the rotation of the pulley may in nowise be impeded. A retractile spring 28, preferably similar in form to the spring 23 is provided, one end of this spring 28 being assembled with the ring 29, the other end of the spring terminating in a hook adapted to be mounted successively in the openings 27 in the shank 26 of the arm.

The equalization of the opposed draft forces is brought about in the following manner:—Owing to the fact that the free end of the member 12 is passed about the intermediate pulley 10, the power arm of the three draft animals is made shorter than the power arm of the two draft animals. The two horses attached to the trees 18, are pulling against the three horses attached to the trees 20 and 22. The two horses attached to the trees 18 must have help to produce a state of equilibrium. This aid to the two horses is given by the spring 28 which is under constant tension. The spring 23 is not under constant tension, but is put under momentary tension, by a spasmodic effort upon the part of the two horses which are attached to the trees 18.

Owing to the form given to the arm 24 whereby the same is bifurcated to inclose the end pulley, the said arm is so mounted upon the pivot member 7, that, under the action of the spring 28 the said arm cannot be made effective to impede the movement of the end pulley.

I consider it unnecessary to set forth the dimensions of the device, as the equalizer is adapted to be built in any size, these details being readily worked out by any skilled mechanic, upon an examination of the drawing. It is of course obvious, that such a minor point, as, for instance, the relative diameters of the several pulleys, may be altered to suit the exigencies of the particular case, without in any way impairing the utility of the invention or departing from the principle upon which it operates.

Having thus described the invention what is claimed is:—

1. A draft equalizer including a bar; pulleys mounted upon the bar; a flexible element extended around the pulleys and transversely through the bar; trees carried by the ends of the flexible element; a retractile spring located to the rear of the bar and adjustably uniting the flexible element with the bar and expansible under the efforts of the draft animals at one of said trees; and a retractile spring located to the front of the bar and adjustably connecting the other of said trees with the bar.

2. A device of the class described comprising a bar; pivot members mounted in the bar adjacent the ends thereof; end pulleys journaled for rotation upon the pivot members; an intermediate pulley mounted upon the bar between the end pulleys and adjacent one of the same; a flexible element extended around the end pulleys and having one of its ends passed around the intermediate pulley; trees carried by the ends of the flexible element; a retractile spring located to the rear of the bar and adjustably uniting the flexible element with the bar and expansible under the efforts of the draft animals at the tree remote from the intermediate pulley; and a forwardly extending arm mounted upon the pivot member adjacent the intermediate pulley; and a retractile spring adjustably connecting the arm with the other of said trees.

3. A device of the class described comprising a bar; pivot members mounted in the bar adjacent the ends thereof; end pulleys journaled for rotation upon the pivot members; an intermediate pulley mounted upon the bar between the end pulleys and adjacent one of the same; a flexible element extended around the end pulleys and having one of its ends passed around the intermediate pulley; trees carried by the ends of the flexible element; a retractile spring located to the rear of the bar and adjustably uniting the flexible element with the bar and expansible under the efforts of the draft animals at the tree remote from the intermediate pulley; an arm bifurcated and adapted for mounting upon the pivot member adjacent the intermediate pulley and arranged to inclose the pulley thereon; and a retractile spring adjustably connecting the adjacent tree with the arm.

In testimony that I claim the foregoing as my own, I have hereto affixed my signature in the presence of two witnesses.

HENRY A. SCHAUB.

Witnesses:
 FLORENCE MILLER,
 J. H. DEAN.